United States Patent [19]

Galeazzi et al.

[11] Patent Number: 5,140,786
[45] Date of Patent: Aug. 25, 1992

[54] WASTE COLLECTION DEVICE

[76] Inventors: Giancarlo Galeazzi, Via Bozzolo 57; Angelo Fusaro, Via Roma 72, both of 46049 Volta Mantovana (Province of Mantova), Italy

[21] Appl. No.: 670,853

[22] Filed: Mar. 18, 1991

[30] Foreign Application Priority Data

Oct. 11, 1990 [IT] Italy .................. 18119 A/90

[51] Int. Cl.⁵ ........................................ E02D 27/00
[52] U.S. Cl. ................................. 52/29; 220/484; 52/169.6; 52/173 R
[58] Field of Search .............. 180/53.5; 280/421; 414/608, 659; 406/145, 151, 196; 52/169.5, 169.6, 302, 195, 64, 66, 67, 169.1, 169.6, 29; 4/321; 220/484

[56] References Cited

U.S. PATENT DOCUMENTS

| | | | |
|---|---|---|---|
| 323,224 | 7/1885 | Smith | 406/196 |
| 323,317 | 7/1885 | Smith et al. | 406/151 |
| 592,190 | 10/1897 | Bond | 52/169.6 |
| 1,056,885 | 3/1913 | Chase | 187/3 |
| 1,574,509 | 2/1926 | Oppenhamer | 220/244 |
| 2,064,538 | 12/1936 | Hagan | 220/484 |
| 2,533,640 | 12/1950 | Ulrich | 280/421 |
| 3,017,722 | 1/1962 | Smith | 52/169.5 |
| 3,858,371 | 1/1975 | Averill | 52/169.5 |
| 5,042,840 | 8/1991 | Rieple et al. | 280/421 |

FOREIGN PATENT DOCUMENTS

| | | | |
|---|---|---|---|
| 0240748 | 10/1987 | European Pat. Off. | |
| 646194 | 6/1937 | Fed. Rep. of Germany | 52/64 |
| 1079355 | 1/1961 | Fed. Rep. of Germany | |
| 1177797 | 10/1964 | Fed. Rep. of Germany | 52/169.6 |
| 2416426 | 10/1975 | Fed. Rep. of Germany | 220/484 |
| 3733145 | 4/1989 | Fed. Rep. of Germany | 52/29 |
| 891689 | 3/1944 | France | 414/659 |
| 2482162 | 11/1981 | France | 52/195 |
| 2546141 | 11/1984 | France | |
| 454428 | 6/1968 | Switzerland | 52/169.6 |
| 1448016 | 12/1988 | U.S.S.R. | 52/169.1 |

*Primary Examiner*—James L. Ridgill, Jr.
*Attorney, Agent, or Firm*—Guido Modiano; Albert Josif

[57] ABSTRACT

The waste collection device comprises a structure having a base and a cover which are suitable for delimiting a portion of space for the accommodation of a container. The structure is connected to lifting means suitable for providing movement between a position in which the structure is concealed within a pit and a position in which it protrudes completely from the pit. A hollow column is rigidly associated with the cover and is connected to the container for the insertion of waste.

14 Claims, 3 Drawing Sheets

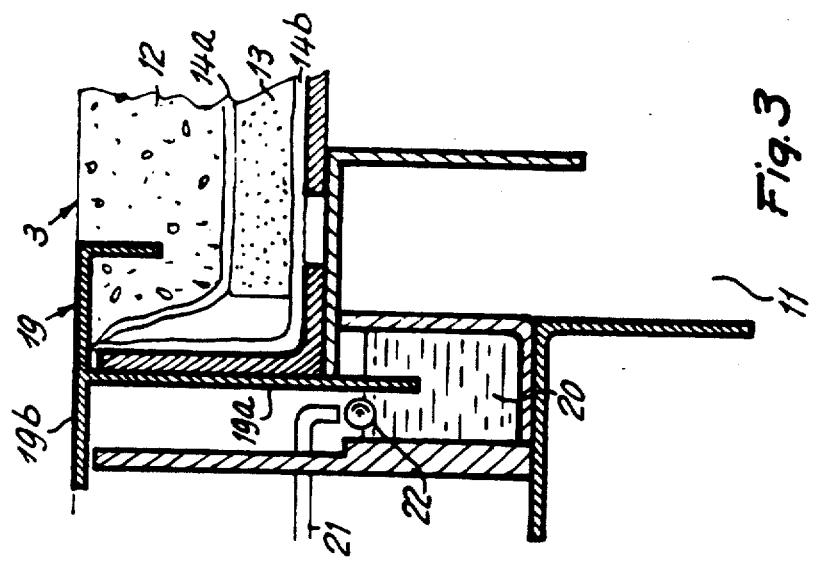
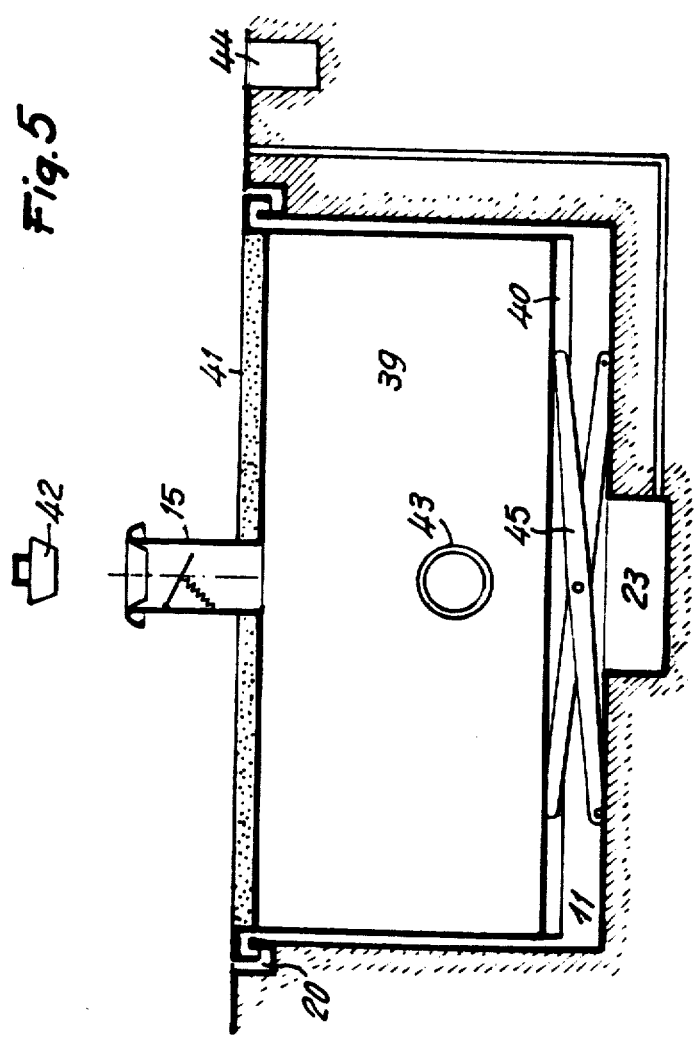

WASTE COLLECTION DEVICE

BACKGROUND OF THE INVENTION

The present invention relates to a waste collection device.

It is known that the collection of solid urban waste is currently performed in an unsatisfactory manner: not only the method of leaving bags filled with rubbish in front of the door of houses, but also the method of inserting said bags and anything which must be disposed into bins arranged along roadways proximate to the sidewalks, in fact create inconvenience for the population from a both aesthetic and hygienic point of view.

In particular, bins furthermore create hindrances to traffic and barriers for the passage of handicapped people, and are also a target for vandalism.

Known collection methods have the further disadvantageous characteristic of entailing a considerable use of labor of the assigned operators.

It should be furthermore added that the problem of collection and pre-storage affects not only solid urban waste but also hospital and industrial waste in general, both liquid and solid.

SUMMARY OF THE INVENTION

The aim of the present invention is therefore to provide a waste collection device which provides the concealment of every element which entails a considerable bulk on the roadway and negatively affects aesthetics, and which furthermore ensures both the maximum protection of the users from the hygienic point of view and a reduction in the labor of the assigned operators.

This aim is achieved by a waste collection device, according to the invention, characterized in that it comprises a structure comprising a base and a cover adapted for delimiting a portion of space for the accommodation of a container, said structure being connected to lifting means suitable for moving it between a position in which it is concealed within a pit, with the cover aligned with the pavement surface which surrounds said pit, and a position in which it protrudes completely from said pit, with its base substantially aligned with said pavement surface, a hollow column being rigidly associated with the cover and being connected to the container for the manual insertion of waste.

BRIEF DESCRIPTION OF THE DRAWINGS

Further characteristics and advantages will become apparent from the description of some preferred but not exclusive embodiments of the invention, illustrated only by way of non-limitative example in the accompanying drawings, wherein:

FIG. 3 is a view of the detail III of FIG. 2;

FIG. 5 is a sectional view, taken along a longitudinal median plane, of the invention according to a further embodiment.

DESCRIPTION OF THE PREFERRED EMBODIMENTS

Figure 1:
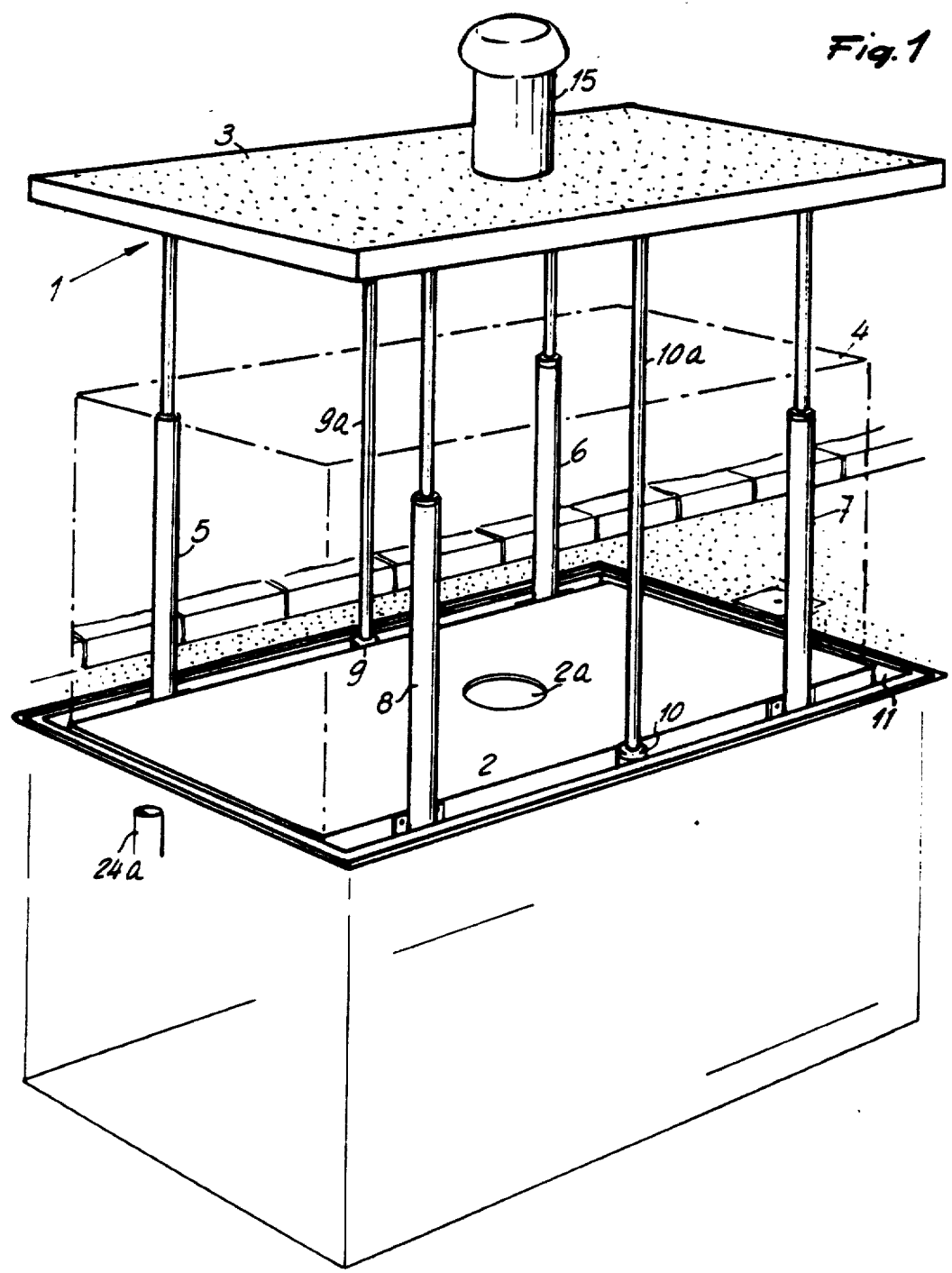
FIG. 1 is a perspective view of the invention with the container accommodation structure, which is indicated in dot-and-dash lines by way of reference in the position in which it protrudes completely from the pit.
Figure 2:
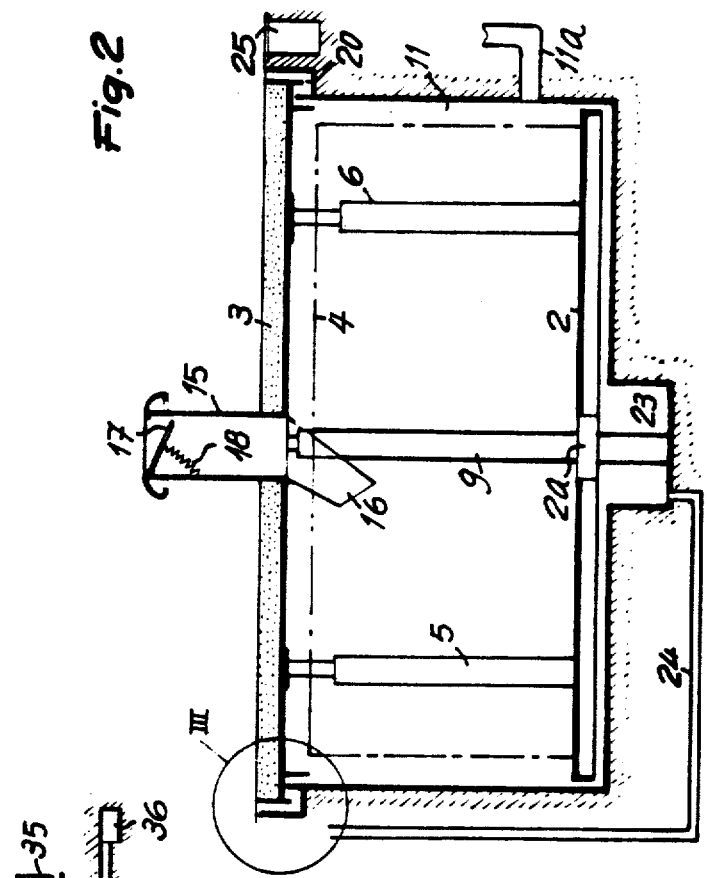
FIG. 2 is a sectional view, taken along a median longitudinal plane, of the invention illustrated in FIG. 1, with the structure in a concealed position within the pit.

With reference to the above FIGS. 1, 2, 3, the reference numeral 1 generally indicates the structure which comprises the base 2 and the cover 3, which are adapted for delimiting a portion of space for the accommodation of the container 4, which has a bottom and rests on the base 1 possibly at sliding guides not illustrated in the figure; the connection between the base 2 and the cover 3 is ensured by telescopic support means comprising telescopic columns 5, 6, 7, 8, which are illustrated in FIGS. 1 and 2 in the maximum and minimum elongation conditions respectively.

The reference numerals 9 and 10 furthermore indicate two hydraulic cylinders which are accommodated within the pit 11; the ends of their stems 9a, 10a are connected to the cover 3, and said cylinders move the described structure (i.e., the base 2, the telescopic support means 5, 6, 7, 8 and the cover 3) between a first position in which it is concealed within the pit 11, illustrated in FIG. 2, with the cover 3 aligned with the pavement surface which surrounds the pit, and a second position in which it protrudes completely from said pit, illustrated in FIG. 1, with the base 2 substantially aligned with said pavement surface.

The lifting of the cover 3 with respect to the base 2, which occurs in this last position by virtue of the connection therebetween provided by means of the described telescopic columns 5, 6, 7, 8, allows to easily move the container 4. The container 4 can be removed from the structure, after inclining it, to empty it periodically.

A hollow column 15 is provided on the cover 3, which comprises a paving or pavement surface 12, that is identical to that which surrounds the pit. The cover 3 also has an underlying condensation-proofing panel 13, which is coated by the bituminous linings 14a, 14b. Said column 15 is connected to the container 4 by means of the orientatable chute 16 for the insertion of waste on the part of users. The chute 16 has smooth walls and a downward-folded upper edge, so as to discourage animals from attempting to penetrate inside it, and is provided with the lid 17, which is kept in closed position by elastic means, schematically indicated by the reference numeral 18, to prevent escape of gasses or odours from the container.

The metallic profiled element generally indicated by the reference numeral 19 is provided along the entire perimeter of the cover 3 and comprises the ridge 19a which is adapted for being immersed, in the maximum lowering position of the cover, in water contained inside the channel 20 which runs around the entire upper periphery pit 11, so as to prevent the escape of gasses or odours from said pit, and furthermore comprises the edge 19b for covering said channel.

The channel 20, which is fed with water from the public water system by means of the duct 21, is kept at the required level by means of the floater device schematically indicated by the reference numeral 22, but may also be filled periodically by assigned personnel.

In the described embodiment, a trap 23 is provided for collecting the water for washing the container 4; said water reaches said trap by falling through corresponding holes defined respectively in the bottom of the container 4 and in the base 2; said last hole is indicated by the reference numeral 2a, and the numeral 24 indicates a duct for drawing water from said trap, which leads to an outlet section 24a which exits at the pavement surface proximate to the pit 11 and through which the water can be drawn in order to empty the trap.

Finally, the reference numeral 25 indicates the space for accommodating the control unit of the hydraulic cylinders 9 and 10, and 11a indicates a vent duct which appears to be interrupted in the drawing but actually extends vertically to vent at a high level, following for example the wall of a building.

Figure 4:
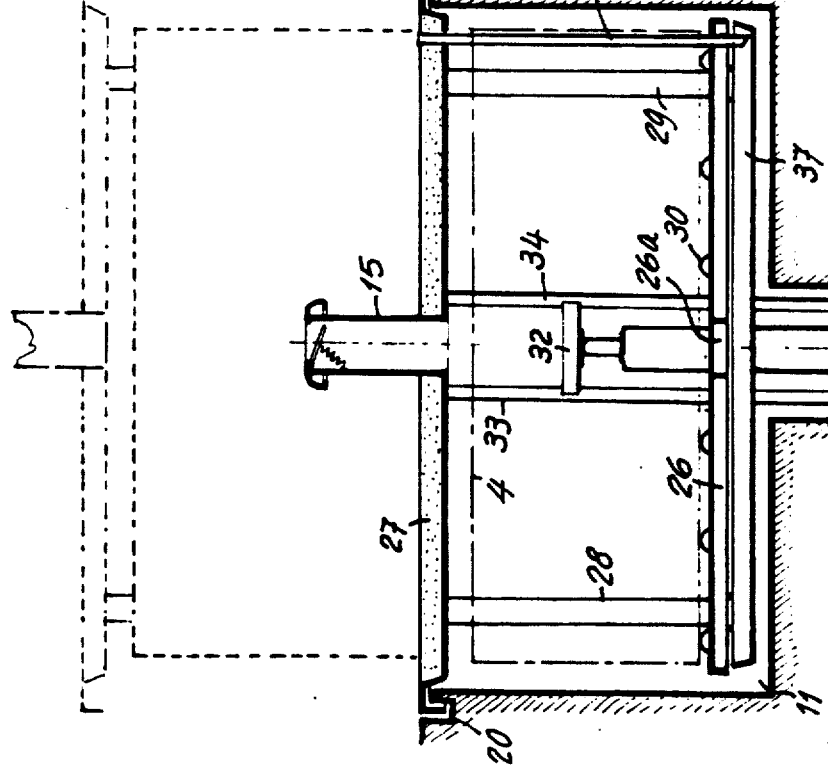
FIG. 4 is a sectional view, taken a longitudinal median plane, of the invention according to another embodiment, with the structure illustrated in solid lines in its concealed position inside the pit and in broken lines in the protruding position.

FIG. 4 illustrates an embodiment of the invention, wherein the structure for accommodating the container 4 is monolithic, since it comprises a base 26 and a cover 27 which are connected by means of monolithic columns such as 28 and 29, thus allowing the extraction of the container 4, when it is emptied periodically, exclusively by rolling on the rollers such as the rollers 30 with which the base 26 is provided.

The movement of the structure between the position in which it is concealed in the pit 11, illustrated in solid lines, and the position in which it protrudes completely, illustrated in broken lines, is provided by virtue of lifting means which comprise the hydraulic cylinder 31, the end of the stem whereof is connected to the crossmember 32 supported by uprights 33 and 34 rigidly associated with the structure. The cylinder 31 is supplied with the actuation fluid by a control unit accommodated on a vehicle, such as for example a truck intended to empty the container, by means of ducts which are inserted by means of quick-couplings in the control console 35.

As in the previously described embodiment, the cover 27 has a column 15 for introducing waste into the container 4, and has a perimetric profiled element with a ridge which is inserted in the channel 20 arranged at the periphery of the pit 11 to prevent escape of gasses or odours; FIG. 4 also illustrates a duct 36 for connecting the channel 20 to the road sewer in order to allow emptying of said channel.

The water for washing the container 4 is collected in the tank 37, arranged below the base 26 and is rigidly associated therewith. Water reaches said tank by falling through corresponding holes defined respectively in the bottom of the container 4 and in the base 26, the latter hole being indicated by the numeral 26a. The numeral 38 furthermore indicates a duct for drawing water from said tank which is rigidly associated with the structure of the device and leads onto the cover 27; the water can be drawn through said duct to empty the tank.

FIG. 5 illustrates another embodiment of the invention, in which the container 39 is rigidly associated with the base 40, which defines the bottom of said container, and with the cover 41; the walls of the container connect said base and said cover.

In this embodiment of the invention, the container can no longer be extracted to empty it, but by virtue of the fact that it is closed tight after placing the plug 42 on the column 15 provided on the cover 41, said emptying can be obtained by suction on a vehicle by means of a duct connected to the coupling inlet indicated by the reference numeral 43, after the container has been lifted out of the pit 11 by actuating the control unit inserted in the space 44 for the actuation of the pantograph lifting device generally indicated by the reference numeral 45.

The channel 20 at the edge of the pit 11 and the trap 23 for collecting the washing water of the container 39 are provided in this embodiment as well.

From the foregoing, it is clear that the invention provides a device which, by virtue of the possibility of providing the containers inserted in pits with considerable dimensions without affecting the roadways with bulky items except for the irrelevant bulk of the waste insertion columns, allows widely spaced emptying interventions, with a considerable saving in labor with respect to known methods.

It should furthermore be noted that the invention also completely solves the problems posed from the aesthetic and hygienic point of view.

The described invention is susceptible to numerous modifications and variations, all of which are within the scope of the inventive concept: thus, for example, the pit 11 can be provided with inspection tunnels.

In the practical embodiment of the invention, the materials employed, as well as the shapes and dimensions, may be any according to the requirements.

We claim:

1. In combination, a waste collection device and a pit, said pit being surrounded by a pavement surface; said waste collection device comprising;
   a base;
   telescopic support means extending upwardly from said base;
   a cover supported above said base by said support means;
   a space defined between said base and said cover;
   a container accommodated within said space;
   lifting means accommodated within said pit and being connected to said cover, said lifting means being operable for raising said base, said telescopic support means, said cover and said container from a first position, whereat said cover is substantially aligned with said pavement surface, to a second position, whereat said base is substantially aligned with said pavement surface;
   chute means provided through said cover above said container for introduction of waste into said container in said second position,
   wherein said telescopic support means are extendable for moving said cover upwardly away from said base upon said base being aligned with said pavement surface;
   whereby to permit removal of said container from within said space for emptying said container while maintaining compact dimensions of said pit.

2. Combination according to claim 1, wherein said lifting means comprise at least two hydraulic cylinders, said hydraulic cylinders being accommodated in said pit and having stems, said stems being attached to said cover.

3. Combination according to claim 1, wherein said chute means comprise at least one hollow column provided on said cover, and at least one chute connecting said hollow column to said container.

4. Combination according to claim 1, further comprising at least one vent duct in communication with said pit.

5. Combination according to claim 1, wherein said telescopic support means comprise a plurality of telescopic columns.

6. Combination according to claim 1, wherein said cover upwardly defines a cover pavement surface, and wherein said cover downwardly defines a condensation-proofing panel.

7. Combination according to claim 6, wherein said cover pavement surface is identical to said surface surrounding said pit, and wherein said condensation proofing panel comprises bituminous linings.

8. Combination according to claim 1, further comprising;
   an upper periphery defined by said pit;
   a perimeter defined by said cover;
   a channel containing liquid and extending around said upper periphery;
   a profiled element extending around said perimeter of said cover;
   a ridge defined by said profiled element and protruding downwardly from said cover, said ridge being at least partially immersible in said liquid contained in said channel with said cover in said first position, and;
   an edge defined by said profiled element and protruding laterally from said cover, said edge covering said channel with said cover in said first position;
   whereby to prevent escape of odor and gases from said container.

9. Combination according to claim 1, further comprising at least one duct, said duct being connected to said channel and connectable to a water supply for introducing water into said channel.

10. Combination according to claim 1, further comprising trap means, said trap means being located within said pit beneath said base.

11. Combination according to claim 10, further comprising trap duct means, said trap duct means communicating with said trap whereby to permit drawing of liquid therefrom.

12. In combination, a waste collection device and a pit,
   said pit being surrounded by a pavement surface;
   said waste collection device comprising;
   a base;
   a plurality of telescopic columns extending upwardly from said base;
   a cover supported above said base by said support means;
   a space defined between said base and said cover;
   a container accommodated within said space;
   lifting means comprising at least two hydraulic cylinders, said hydraulic cylinders being accommodated in said pit and having stems, said stems being attached to said cover, said hydraulic cylinders being operable for raising said base, said telescopic support means, said cover and said container from a first position, whereat said cover is substantially aligned with said pavement surface, to a second position, whereat said base is substantially aligned with said pavement surface;
   a hollow column provided through said cover above said container;
   a chute located above said container and being connected to said hollow column for introduction of waste into said container when said cover is in said second position,
   wherein said plurality of telescopic columns are extendable for moving said cover upwardly away from said base upon said base being aligned with said pavement surface;
   whereby to permit removal of said container from within said space for emptying said container while maintaining compact dimensions of said pit.

13. Combination according to claim 12, further comprising;
   an upper periphery defined by said pit;
   a perimeter defined by said cover;
   a channel containing liquid and extending around said upper periphery;
   a profiled element extending around said perimeter of said cover;
   a ridge defined by said profiled element and protruding downwardly from said cover, said ridge being at least partially immersible in said liquid contained in said channel with said cover in said first position, and;
   an edge defined by said profiled element and protruding laterally from said cover, said edge covering said channel with said cover in said first position;
   whereby to prevent escape of odor and gases from said container.

14. Combination according to claim 13, further comprising at least one duct, said duct being connected to said channel and connectable to a water supply for introducing water into said channel.

* * * * *